Patented Mar. 8, 1932

1,848,510

UNITED STATES PATENT OFFICE

KLAUS WEINAND, OF LEVERKUSEN-ON-THE-RHINE, GERMANY, ASSIGNOR TO GENERAL ANILINE WORKS, INC., OF NEW YORK, N. Y., A CORPORATION OF DELAWARE

NEW ACID WOOL DYESTUFFS OF THE ANTHRAQUINONE SERIES

No Drawing. Application filed February 19, 1931, Serial No. 517,109, and in Germany February 25, 1930.

The present invention relates to new acid wool dyestuffs of the anthraquinone series.

In accordance with the invention new acid wool dyestuffs of the anthraquinone series are obtained by reacting upon quinizarine-6-sulfonic acid with para-aminoformanilide or para-aminoacetanilide or such derivatives of these compounds as are substituted at the nitrogen atom by alkyl groups. The reaction may be performed in the manner usually applied for the replacement of hydroxy groups connected with anthraquinone nuclei by the residues of aromatic amines. For example, quinizarine-6-sulfonic acid is introduced into a suitable organic solvent, preferably glacial acetic acid, para-aminoformanilide or -acetanilide is added and, furthermore, boric acid and a suitable reducing agent, preferably zinc powder or stannous chloride, and the mixture is heated, advantageously to about 100–110° C., for several hours until reaction is complete. Likewise, it will be possible in some cases to work in the absence of an organic solvent by heating the reaction mixture to a temperature at which the mixture becomes liquid, but I prefer to work in the presence of a suitable organic solvent according to the directions given above.

The products thus obtainable, which probably correspond to the general formula:—

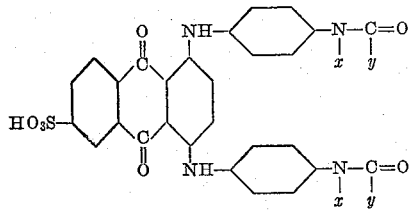

wherein the $x$'s mean hydrogen or alkyl, the $y$'s hydrogen or methyl, form yellowish-green to green needles, which can be recrystallized from water or a pyridine/water or alcohol/water mixture. The alkali metal salts of the compounds in question are easily soluble in water with a yellowish-green to green coloration. The new products dye wool from an acid bath yellowish-green to green shades of good fastness properties. In comparison with the known dyestuffs of similar structure the new dyestuffs dye more even shades.

The following example illustrates my invention without limiting it thereto:—

*Example.*—10 parts by weight of quinizarine-6-sulfonic acid, 30 parts by weight of para-aminoacetanilide, 10 parts by weight of boric acid and 1 part by weight of zinc powder are stirred with 100 parts by weight of glacial acetic acid for three to four hours at a temperature of 100–110° C. Then the reaction mixture is poured into 1000 parts by weight of water, 200 parts by weight of an aqueous sodium hydroxide solution of 30° Bé. are added and the yellowish-green needles which separate are filtered and washed with water. The dyestuff may be recrystallized from water containing 5% by weight of pyridine. It dyes wool from an acid bath a very even yellowish-green of good fastness properties.

When replacing in the above example the para-aminoacetanilide by an equivalent amount of para-aminoformanilide, para-aminomethylformanilide, para-aminomethylacetanilide, para-aminoethylformanilide or para-aminoethylacetanilide dyestuffs of similar properties, likewise yielding very even dyeings of yellowish-green to green shades are obtained.

I claim:—

1. The dyestuffs of the probable general formula:—

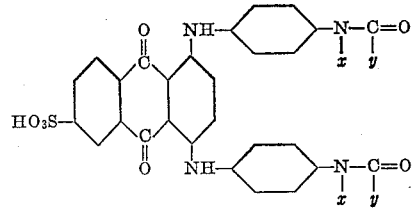

wherein the $x$'s mean hydrogen or alkyl, the $y$'s hydrogen or methyl, said dyestuffs forming yellowish-green to green needles, dyeing wool from an acid bath yellowish-green to green even shades of good fastness properties.

2. The dyestuff of the probable formula:—

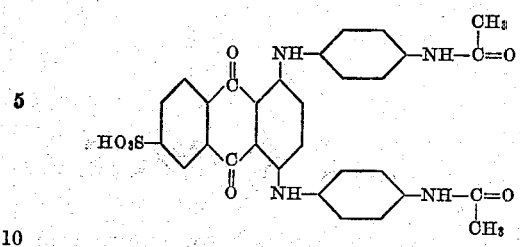

said dyestuff forming yellowish-green needles, dyeing wool from an acid bath yellowish-green even shades of good fastness properties.

3. The dyestuff of the probable formula:—

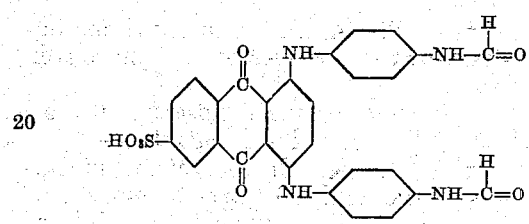

said dyestuff forming yellowish-green needles dyeing wool from an acid bath yellowish-green even shades of good fastness properties.

In testimony whereof, I affix my signature.

KLAUS WEINAND.